US009851469B2

(12) United States Patent
Embid Droz et al.

(10) Patent No.: US 9,851,469 B2
(45) Date of Patent: Dec. 26, 2017

(54) PRODUCTION STRATEGY PLANS ASSESMENT METHOD, SYSTEM AND PROGRAM PRODUCT

(71) Applicants: Repsol, S.A., Madrid (ES); International Business Machines Corporation, Armonk, NY (US)

(72) Inventors: Sonia Mariette Embid Droz, Madrid (ES); Ruben Rodriguez Torrado, Madrid (ES); Mohamed Ahmed Hegazy, Heliopolis Cairo (EG); David Echeverria Ciaurri, New York, NY (US); Ulisses T. Mello, Blauvelt, NY (US)

(73) Assignees: REPSOL, S.A., Madrid (ES); International Business Machines Corporation, Armonk, NY (US)

( * ) Notice: Subject to any disclaimer, the term of this patent is extended or adjusted under 35 U.S.C. 154(b) by 905 days.

(21) Appl. No.: 14/220,606

(22) Filed: Mar. 20, 2014

(65) Prior Publication Data
US 2014/0365183 A1  Dec. 11, 2014

(30) Foreign Application Priority Data
Jun. 6, 2013  (EP) .................................... 13382215

(51) Int. Cl.
G06G 7/48  (2006.01)
G01V 99/00  (2009.01)
E21B 43/00  (2006.01)
E21B 41/00  (2006.01)

(52) U.S. Cl.
CPC ........ *G01V 99/005* (2013.01); *E21B 41/0092* (2013.01); *E21B 43/00* (2013.01)

(58) Field of Classification Search
CPC .................................................... G01V 99/005
USPC .......................................................... 703/10
See application file for complete search history.

(56) References Cited

U.S. PATENT DOCUMENTS

| | | |
|---|---|---|
| 4,249,776 A | 2/1981 | Shuck et al. |
| 6,549,879 B1 | 4/2003 | Cullick et al. |
| 7,657,494 B2 | 2/2010 | Wilkinson et al. |
| 8,479,812 B2 | 7/2013 | Zupanich |
| 2008/0300793 A1 | 12/2008 | Tilke et al. |
| 2010/0179797 A1 | 7/2010 | Cullick et al. |
| 2010/0185427 A1 | 7/2010 | Tilke et al. |

(Continued)

FOREIGN PATENT DOCUMENTS

| | | |
|---|---|---|
| CA | 2278735 | 12/2005 |
| CA | 2643911 | 9/2007 |

(Continued)

OTHER PUBLICATIONS

PCT ISR dated Sep. 9, 2014, 13 pp.

(Continued)

*Primary Examiner* — Hugh Jones
(74) *Attorney, Agent, or Firm* — Law Office of Charles W. Peterson, Jr.; Louis J. Percello, Esq.

(57) ABSTRACT

A system, method and computer program product for generating well location plans and field development plans assessing and ranking the potential of the different plans with a small number of parameters or initial conditions, thus considerably reducing the decision time for taking a particular strategy when compared with the techniques described in the art.

20 Claims, 6 Drawing Sheets

(56) References Cited

U.S. PATENT DOCUMENTS

2011/0307227 A1    12/2011  Poe
2013/0020131 A1     1/2013  Le Ravalec et al.

FOREIGN PATENT DOCUMENTS

CN        101515372        8/2009
CN        102216562       10/2011

OTHER PUBLICATIONS

PCT ISR dated Oct. 15, 2014, 10 pp.
Moho Ghazali, Abo Karim et al: "Optimizing Development Strategy and Maximizing Field Economic Recovery through Simulation Opportunity Index", Society of Petroleum Engineers, SPE, Oct. 9, 2011 (Oct. 9, 2011), 6 pp.
Obiajulu J Isebor et al: "Generalized Field Development Optimization Using Derivative-Free Procedures", Society of Petroleum Engineers, SPE, Feb. 20, 2013 (Feb. 20, 2013), pp. 1-21.
Patent Office of the People's Republic of China, Notification of First Office Action, dated Apr. 18, 2017, 6 pp.

PRODUCTION STRATEGY PLANS ASSESMENT METHOD, SYSTEM AND PROGRAM PRODUCT

CROSS REFERENCE TO RELATED APPLICATION

The present application claims priority under 35 USC §119 to European Patent Application No. EP13382215, "METHOD FOR ASSESING PRODUCTION STRATEGY PLANS" to Embid Droz et al.; and is related to European Patent Application No. EP13382214, "METHOD FOR SELECTING AND OPTIMIZING OIL FIELD CONTROLS FOR PRODUCTION PLATEAU" to Embid Droz et al., both filed Jun. 6, 2013 with the Spanish Patent Office, assigned to the assignees of the present invention and incorporated herein by reference.

BACKGROUND OF THE INVENTION

Field of the Invention

The present invention is related to generating production strategy plans and field development plans, assessing and ranking the potential of the different plans with a small number of parameters or initial conditions, thus considerably reducing the decision time for taking a particular strategy when compared with state of the art techniques.

Background Description

A typical state of the art hydrocarbon reservoir production strategy provides production decisions for a given planning horizon on a drilling schedule to maximize production. A typical planning horizon may locate production and injection wells. The drilling schedule may indicate which wells are to be drilled and when, and the production rate at which the wells are to operate. Varying the position, schedule and/or control of each wells may vary production to have a multimillion-dollar impact. Thus, evaluating reservoir production potential and economic performance over a wide range of alternative oil and gas production strategies is crucial. Also, because there are a large number of variables in selecting the strategy, it has been a time-consuming activity. Frequently, available information is limited, and based on uncertain reservoir geological and petro-physical properties. Typically, major investment decisions must be made on this limited information, especially when subterranean-flooding (e.g., with water) is the main production strategy.

Previously, experienced reservoir engineers heuristically defined and ranked complex production development plans, using trial-and-error to deal with problem components, separately and sequentially. After selecting drilling locations, for example, engineers heuristically defined a well drilling schedule. However, these ad hoc heuristic solutions, frequently have application only within the limited framework for which they were developed. Additionally, rather than arriving at the best overall or optimum realization, separately and sequentially dealing components may have discarded the most attractive or optimal solutions.

Thus, there is a need for dramatically reducing the number of drilling configurations that must be considered for a comprehensive reservoir production strategy and more particularly for rapidly generating and ranking several representative development plans under uncertainty to quickly converge on plans that jointly encompass all available production aspects.

SUMMARY OF THE INVENTION

The present invention relates to a system, method and computer program product for generating well location plans and field development plans, assessing and ranking the potential of the different plans with a small number of parameters or initial conditions, thus considerably reducing the decision time for taking a particular strategy when compared with state of the art techniques.

The preferred method generates production strategies suitable for the exploitation of a reservoir of hydrocarbon in a natural environment, wherein said natural environment is limited in its surface by a domain ($\Omega$). If hydrocarbon reservoir is surrounded by water, then the domain ($\Omega$) may be defined in such a way the hydrocarbon reservoir is completely located within the domain ($\Omega$). Preferably, the method includes determining a reference system in the domain ($\Omega$), determining an opportunity index (OI) as a function defined in the domain ($\Omega$) providing the local production potential as a function of the location and the local properties determining a radius of drainage (rd) providing the radius of drainage of the hydrocarbon at the end of life of a production well as a function of the opportunity index rd=rd(OI);

identifying production behavior zone cluster or clusters as locations with similar local production behavior;

for each cluster to be exploited:

determining a representative value of the opportunity index OI and its corresponding radius of drainage rd=rd(OI);

providing an angle $\alpha$;

generating a discretization of the cluster according to a grid with a regular pattern wherein the distance between the closest nodes of the pattern is 2*rd, and the orientation of the grid, selecting a reference line in the grid, in the reference system is the angle $\alpha$;

determining the production well locations in the cluster as the coordinates of the nodes of the grid located within the cluster.

Determining the location of production wells as the production strategy according to this method reduces the number of potential development plans in a certain domain ($\Omega$) necessary to achieve an accurate reservoir simulation.

For that purpose, an opportunity index is defined as a function that quantifies, for every location, the hydrocarbon production potential taking into account the local properties of every location—for example, as a function proportional to the amount of hydrocarbon trapped in that location and inversely proportional to the ability of hydrocarbon to flow thorough the rocks in that location. The information about the local properties of every location retrieved from the collected data may be obtained by averaging a set of geological models, named as "reservoir realizations" taking into account the uncertainty wherein each model may be simulated using CFD (Computational Fluid Dynamic) codes. Departing from deterministic data, tools like interpolation, Design of Experiments and others, provide a set of reservoir realizations taking into account the uncertainty. Statistic variables as average values or dispersion measures may be evaluated over the whole set of reservoir realizations. In the particular case of the opportunity index, the value taken in a predetermined location is the average measured on the whole set of reservoir realizations computed by means of simulations.

The locations with a similar opportunity index are grouped in zones called clusters, each one thus having similar behavior in terms of hydrocarbon production potential. It is understood that "locations with similar OI," locations whose OI is within a certain range of values. It is possible to provide only one cluster if the whole domain has a similar behavior in terms of hydrocarbon production potential.

A new function, the radius of drainage, is determined from the OI and, in some cases, also as a function of other variables to be explained in further detail herein. The radius of drainage is a measure of the optimal radius of extraction for every well, since it provides for each well the radius of extraction at the end of the life of extraction under ideal conditions in such a way that the circumference determined by such radius with center in every well are tangent one each other.

This association between a function of the potentiality of a location for hydrocarbon production and the radius of extraction of every well is an advantageous way of generating a well location plan with a number of parameters low enough as to not needing important computational resources.

For every cluster, a representative value of the OI is taken (for example, the arithmetic mean of the extremes of the range that defines a cluster) and the subsequent rd is then calculated.

The number of parameters to generate a well location plan is relatively small, and therefore the every plan can be quickly obtained from a set of parameters. Some of these parameters, as has been stated, relate the OI and the rd, as a function of the local properties. Others define a reference system and the planned well location with reference to this system such as the location of a first point of each patterned grid and the angle of a reference line of such grid.

Once the reference system is defined, since the radiuses of drainage are tangent one each other, the well must be located at a distance of 2rd to comply with this condition. Keeping this condition, and starting at the origin of the first point, the grid is generated to discretize the cluster—the nodes are the possible location of the wells themselves, separated as has been said a distance 2rd. The grid is therefore a patterned grid, and its orientation with respect to the reference system is given by an angle $\alpha$ and is one of the parameters of the well location plan taking a reference line of the grid. Once this angle $\alpha$ is provided, the well location is given by the position of the nodes of the patterned grid with respect to the reference system.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
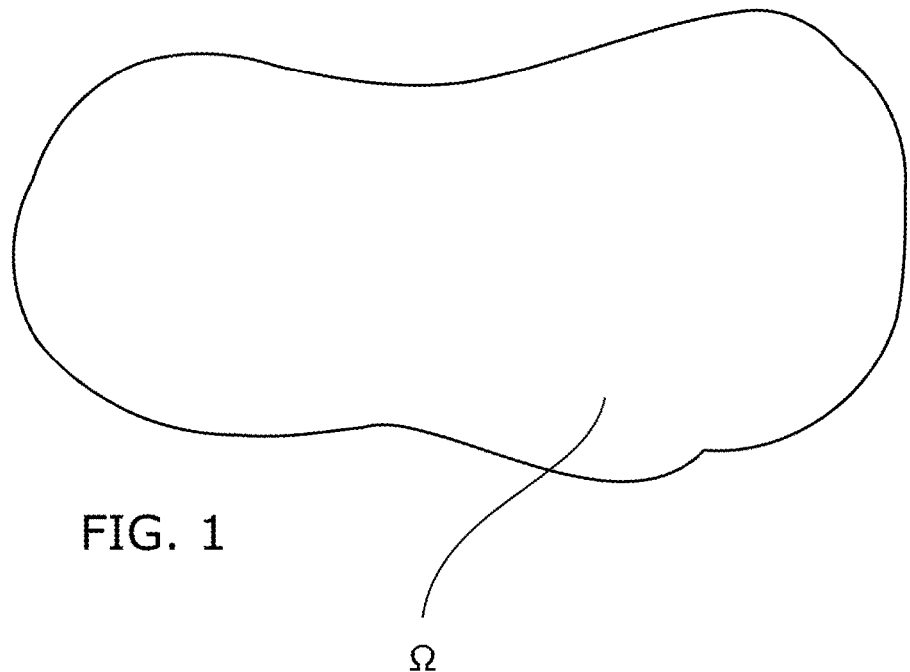
FIG. 1 shows an example of a domain where an oil field development is carried out.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a domain for an oil field development, i.e., a well location plan, according to a preferred embodiment of the present invention.

An opportunity index (OI) defines the hydrocarbon production potential of certain location of a domain ($\Omega$), and then the radius of drainage (rd) for such location is defined as a function of the OI so that the higher the OI the higher the rd.

In one embodiment the relation between OI and rd is $rd=a*OI^b$, where a and b, positive constants based on local properties of every cluster, are, in this example, two of the parameters used to calculate the potential well location plans.

Further, the well location plan is controlled by five parameters per cluster, a number small enough as to allow that the domain ($\Omega$) can be explored by means of experimental design techniques in a relatively exhaustive manner in a matter of a few hours. Apart from a and b, other parameters may be space parameters referred to the reference system (the coordinates of the first point of the patterned grid i and j and the aforementioned angle $\alpha$ of every cluster). Further, the same five parameters may be common to all clusters, such that the total number of parameters is five, regardless of the number of clusters being considered.

Figure 2:
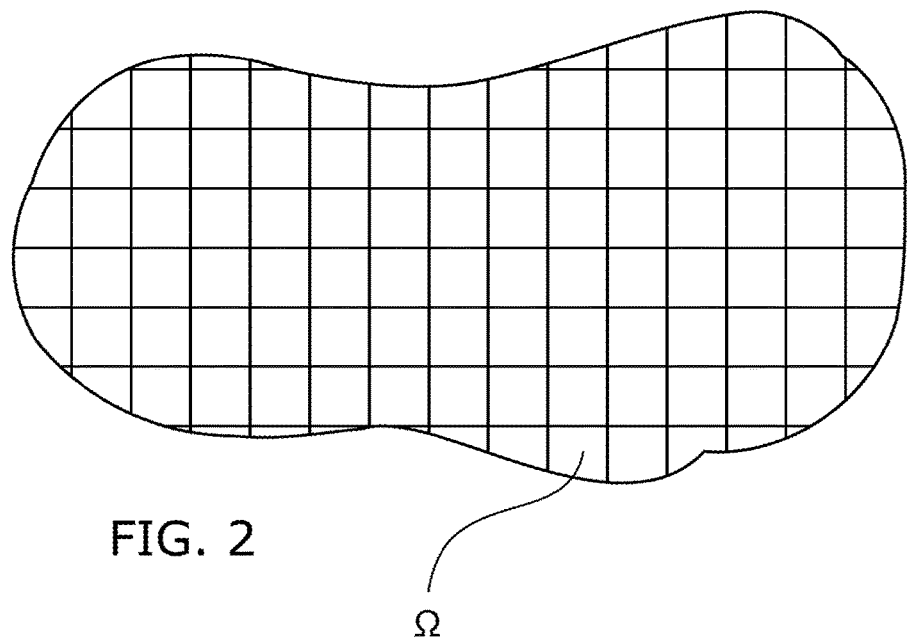
FIG. 2 shows an example of a domain discretized in cells according to a regular grid in a Cartesian reference system.

As it is shown in FIG. 2, the domain ($\Omega$) is discretized in cells for computational purposes. The computational grid shown in FIG. 2 has been chosen very coarse and regular intentionally in order to be clearer. For every cell, the OI must be estimated or calculated. This is the case when the numerical simulations of the flow carried out over the domain are based on finite volume methods or finite element methods just as an example. At this stage only the reservoir geological and petro-physical properties are needed.

Figure 5:
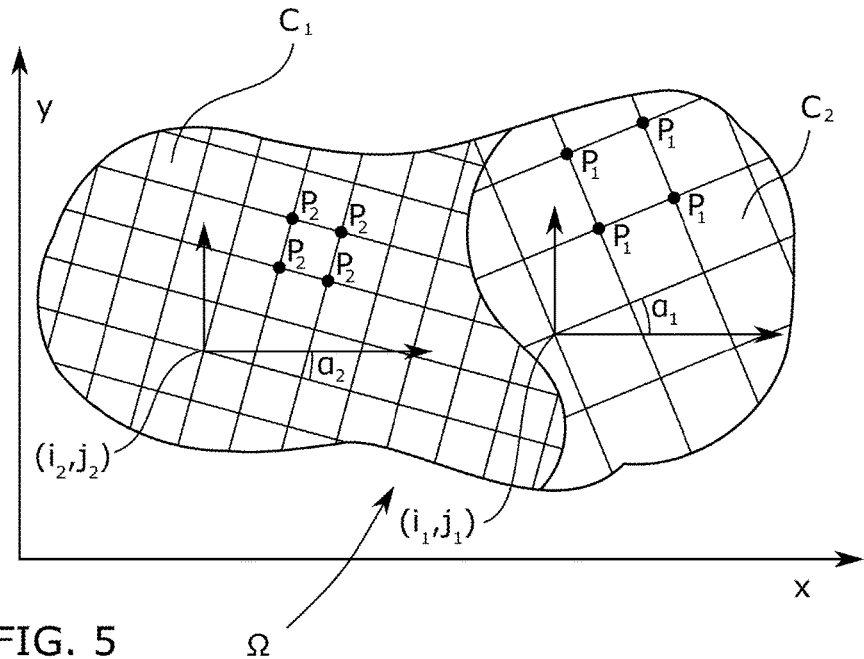
FIG. 5 shows an example of a domain divided in two clusters, each of them with an associated opportunity index, radius of drainage and angle $\alpha$.

The domain ($\Omega$) is divided in clusters (C1, C2), as in FIG. 5, whose locations have an opportunity index comprised within a particular range. A representative OI is associated to each cluster (C1, C2), for instance the average value over the cluster, and, as has been already explained, a representative rd is calculated, for example, according to the formula $rd=a*OI^b$.

Figure 3A:
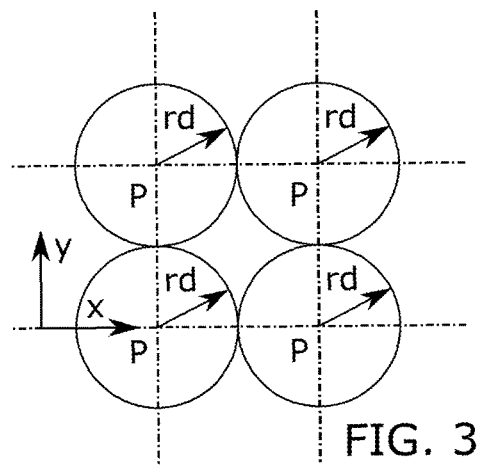
FIGS. 3A-B show examples of several nodes of the grid where the production wells are located, and the radius of drainage of these production wells at the end of their productive lives in a square patterned grid example and a equilateral triangle patterned grid example.
Figure 3B:
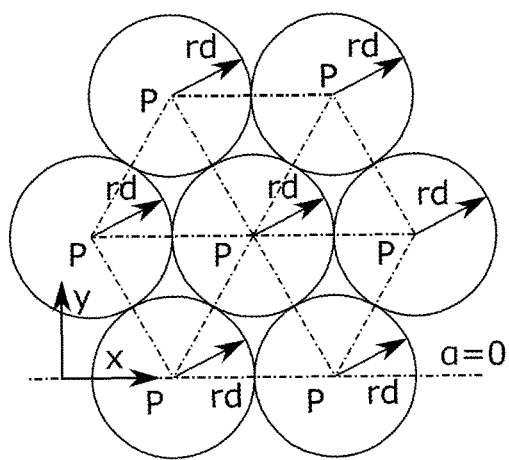

As it is shown in FIGS. 3A and 3B, once the rd has been calculated the grid spacing is determined. The nodes of the grid are taken as production well locations, and therefore the grid spacing is chosen as 2·rd in order to optimize the well locations as, at the end of its production life, each well production would drain the maximum area not overlapping the surrounding drainage areas of contiguous production wells. FIG. 3A shows a pattern of the center of the circumferences made of squares and FIG. 3B shows a pattern made of equilateral triangles. Both are represented in a reference system (x,y) and oriented according to the angle $\alpha=0$ selecting a reference line of the grid. In yet another example, the pattern of the center of the circumferences may be of rectangles, where a and b are sides of the rectangles.

Figure 4:
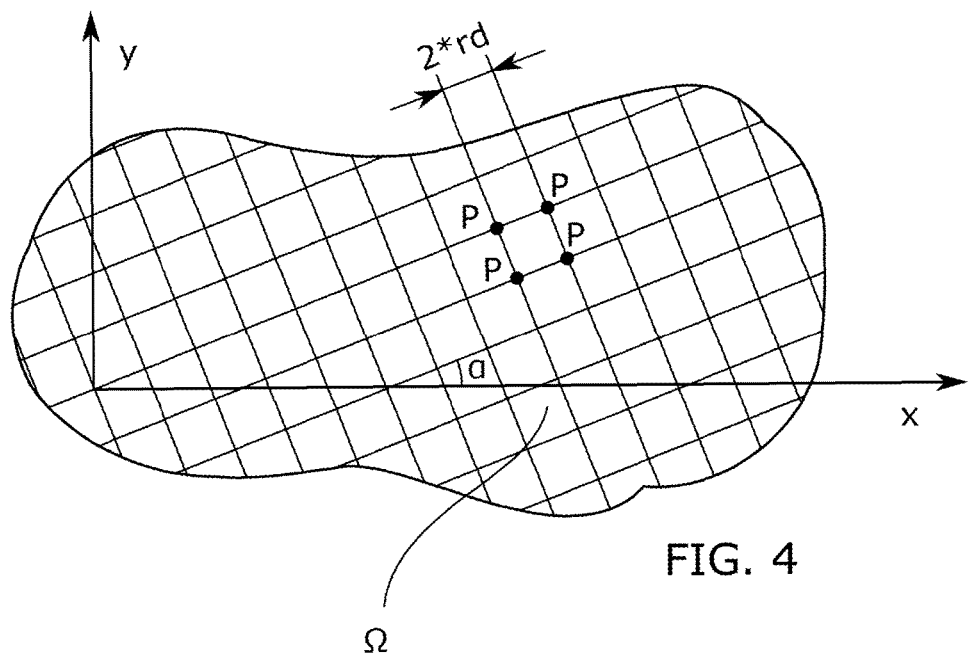
FIG. 4 shows an example of the location of the production wells, separated one each other a distance twice the radius of drainage, for a grid defined with respect to a reference system by an angle $\alpha$.

Once the different clusters, with its OI and rd, have been defined, the location of the production wells (P) for this particular plan (calculated with a particular set of initial parameters) is obtained for each cluster defining a patterned grid in which the distance between closest nodes is twice the radius of drainage (rd)—this can be seen in the examples of FIGS. 4 and 5 wherein square patterns are used, the latter for a case with two clusters (C1, C2) with its corresponding radius of drainage (rd1, rd2); then, the first point of the grid is located in a particular location of the cluster, and the grid is placed with reference to this system by providing another parameter, an angle $\alpha$, which relates one of the axis of the reference system and the direction of a preselected line of the grid. The location of the first point of the grid with respect to the reference system in a bidimensional domain ($\Omega$) and the angle $\alpha$ make a total of three parameters that added to the parameters a and b make, for a particular example, five parameters per cluster to characterize a well location plan.

Since a reduced number of parameters characterizes every well location plan, and each plan provides a good proposal for the exploitation of the reservoir, a much smaller number of well location plans suffices as opposed to prior approaches that very often required several thousands of plans or more. As a result, a reduced number of computational flow simulations are required reducing the total computational effort.

As for selecting the set of parameters (five per cluster in the particular example) that gives as a result a particular well location (P) plan, in a particular example the technique known in the art as Design of Experiments is used. Each set of parameters determine a well location plan. The use of Design of Experiments provides a plurality of different plans according to the disclosed method.

Figure 6:
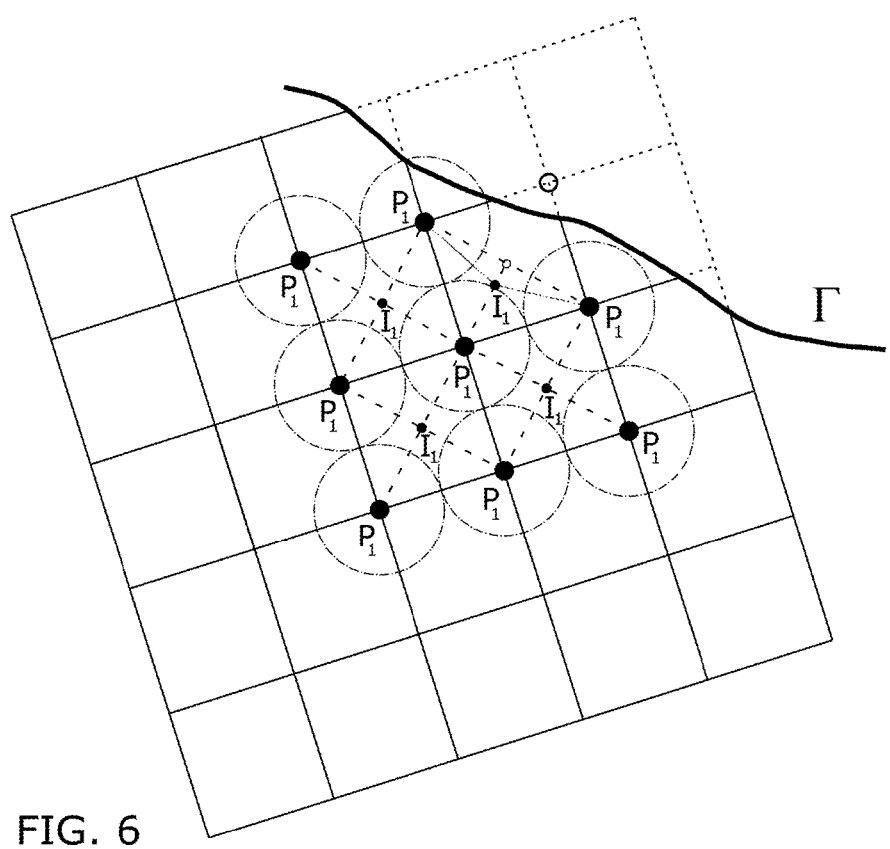
FIG. 6 shows an example of the position of injection wells when these are inside of certain cluster, when a square pattern of four production wells are within the domain and when at least one of the production well of the pattern falls beyond the boundary.

Some development plans comprise, aside from production wells (P), injection wells (I) through which water is added to sweep the different regions of the domain ($\Omega$). The injection wells (I) are, in one particular example, placed at the centroid of the pattern of the grid, for instance the square pattern formed by every four neighbor nodes, that set the locations of the production wells (P) for a certain cluster, as can be seen in FIG. 6. When one of the nodes (P) falls outside of the cluster, at the other side of its boundary, the centroid (I) is calculated with the remaining nodes (P) inside the cluster.

Figure 7:
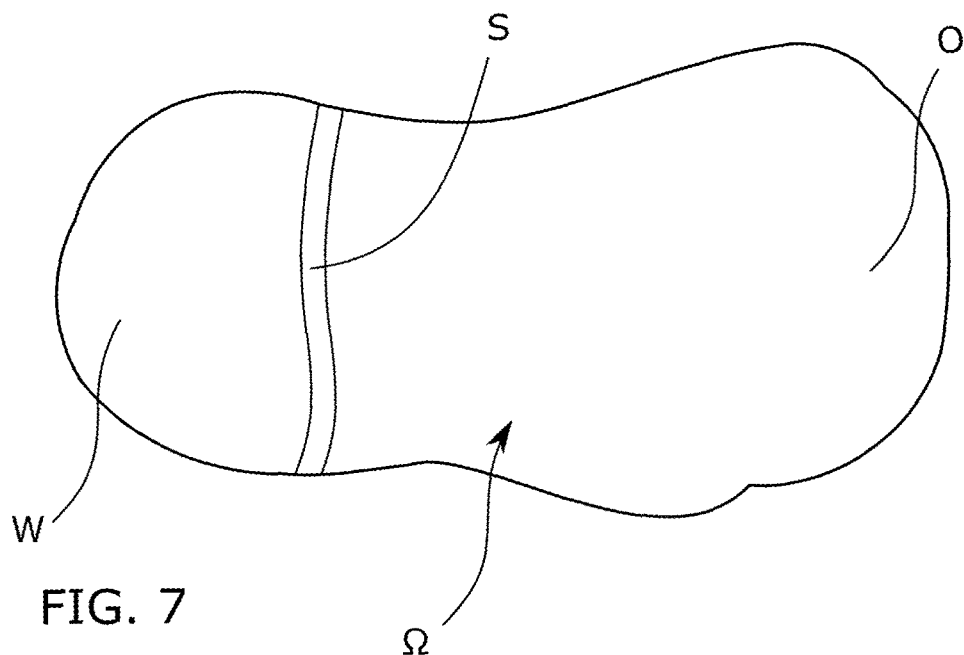
FIG. 7 shows an example of a domain divided in two zones—one with hydrocarbon and another one with water, wherein a strip-shaped region has been defined along the boundary between both zones in the water zone.

Alternatively, if the reservoir is susceptible to peripheral injection, injectors (I) can be located at a strip-shaped region (S) extending along a boundary (F) of the interface between water (W) and hydrocarbon (O) phases of the reservoir and located in the water side of the interface, as shown in FIG. 7. For determining the distance between injection wells (I) in the strip-shaped region, a new function, the injectivity index (II), is defined. The II takes into account the local sweeping potential as a function of the location and its local properties, as the OI did with the oil production potential.

As in the case of the OI, the locations of the strip-shaped region (S) with II within a determined range of values, which is to say locations with a relatively similar behavior, are grouped in injection clusters (S1, S2, S3) in the strip-shaped region (S). A II representative for each injection cluster (S1, S2, S3) is taken, for instance the average value of the II in such cluster.

Likewise, a radius of injection (ri) is calculated from the II for every injection cluster (S1, S2, S3), so that the higher the II the higher the rd, that is, the bigger surface that a single injector (I1, I2, I3) of said cluster (S1, S2, S3) is able to sweep. In a particular example, the ri is expressed as $ri=c*II^d$ wherein c, d are positive constants depending on the local properties for each injection cluster.

Figure 8:
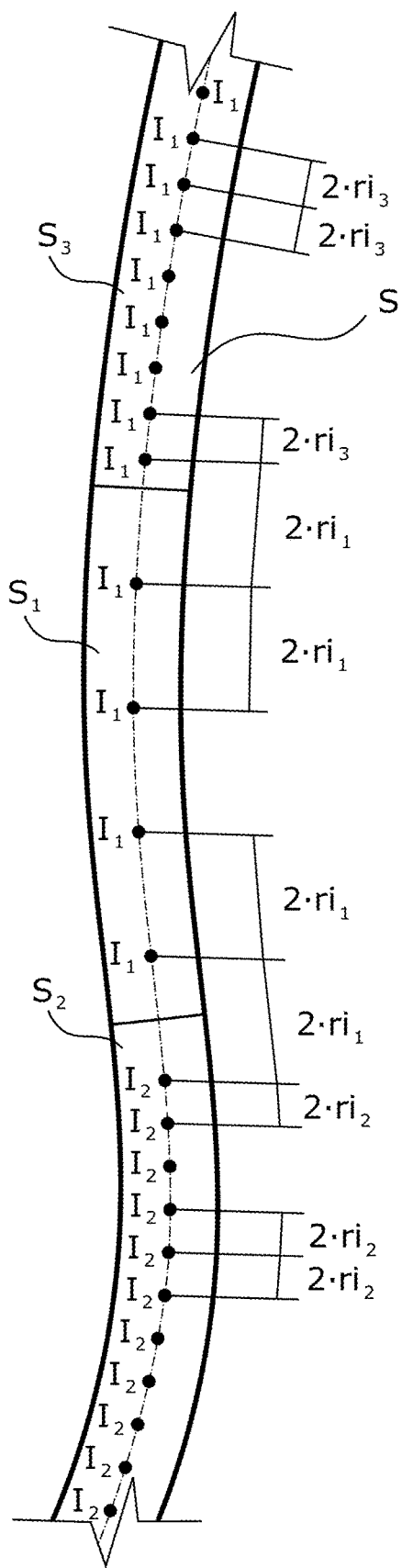
FIG. 8 shows an example of a strip-shaped region corresponding to a domain with peripheral injection, the region being divided in injection clusters each one with its corresponding injectivity index and radius of injection.

The spacing between consecutive injectors (I1, I2, I3) in the strip-shaped region (S), starting from a first injection well location (I1) of the strip-shaped region (S), is calculated as twice the radius of injection (ri1, ri2, ri3) of the injection cluster (S1, S2, S3) where the injection well (I1, I2, I3) is, as can be seen in FIG. 8. When a different injection cluster (S1, S2, S3) is reached, the radius of injection considered is the one of the cluster (S1, S2, S3) of the strip-shaped region (S) where the former injection well (I1, I2, I3) is located. Further injection wells (I1, I2, I3) are located according to the present injection cluster (S1, S2, S3) until a new cluster (S1, S2, S3) is reached.

In a particular example, this generation of injection wells (I1, I2, I3) is continued this way until all the clusters in the strip-shaped regions are exhausted or until the first injection well (I1) is reached (when the strip-shaped region (S) is a close region).

In a further example, the strip-shaped region (S) is the width of a cell of the discretized domain (as the cells in FIG. 2) for computational simulation purposes.

In a further example, the width of the strip-shaped region (S) is a fraction of the distance between a neighbor producer (P) well and the center of its corresponding pattern.

Figure 9:
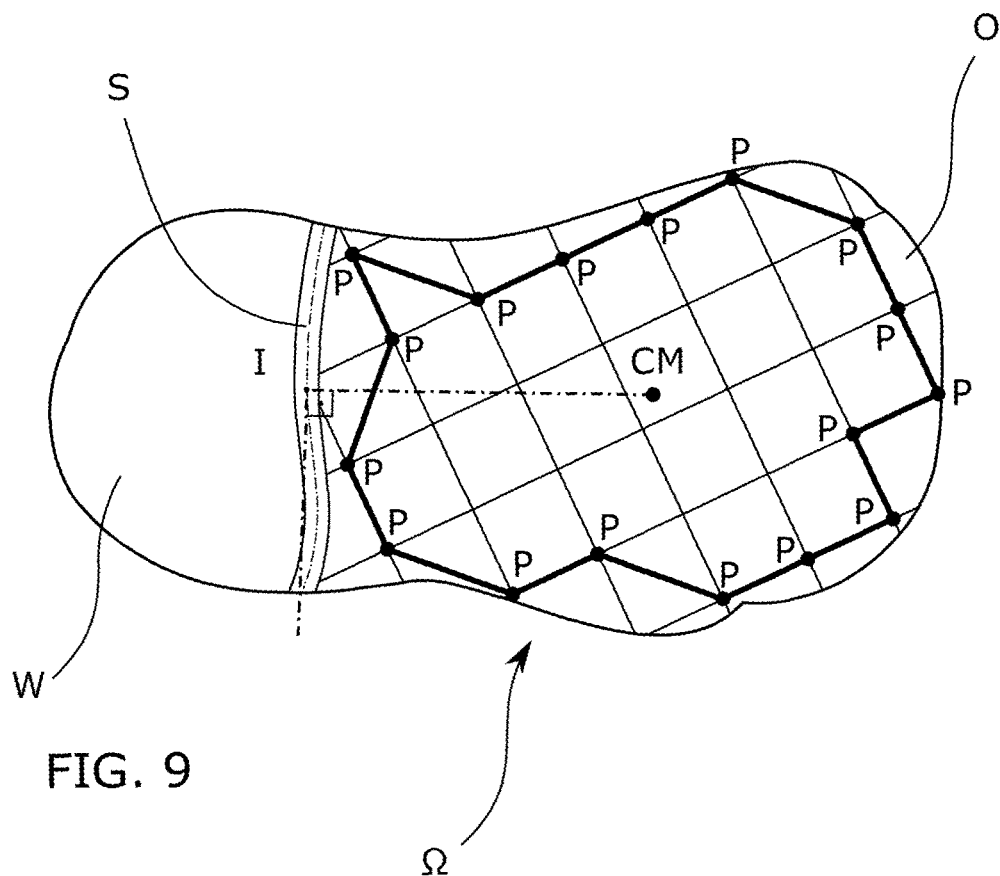
FIG. 9 shows an example of a method of determining the first injection well in a development plan with peripheral injection.

With respect to determining the first injection well (I1) of a strip-shaped region (S) for a peripheral injection, in one example this first location is calculated as shown in FIG. 9, that is, defining a polyhedron with the external production wells (P) of the oil region, calculating the center of mass (CM) of this polyhedron and determining the orthogonal projection of the center of mass with respect to the boundary between the hydrocarbon (O) and the water (W). In a further example, the center of mass is calculated over the whole production wells (P) of the oil region of the cluster.

In a further example, the location of the first injection well (I1) of the strip-shaped region (S) for a peripheral injection is calculated determining the orthogonal projection of the production well (P) having higher opportunity index OI with respect to the boundary between the hydrocarbon (O) and the water (W).

Once all injectors and producers are arranged in the domain, a number of these wells may be removed from the production plan using measures of productivity or injectivity potential. Suitable productivity or injectivity potential measures may include, for example, the opportunity index and the injectivity index.

Similarly to the well location plan, other parameters are used to control the well drilling schedule. The drilling schedule comprises generating a list comprising the production wells (P); or both, production wells (P) and injection wells (I) wherein such list is sorted according to three criteria. In a particular example, three input parameters are used for this task and the list comprises both, production wells (P) and injection wells (I). In a further example, two of these parameters define the sequence of production and injection followed to complete the exploitation of the domain ($\Omega$) (for example, a basic pattern of drilling two producers (P) followed by one injector (I), repeated until all wells (P, I) are considered), and the remaining parameter indicates the time interval between drilling two consecutive wells (assuming it is the same for all the drilling sequence). The order of drilling for both the production wells (P) and the injection wells (I) is predetermined according to different criteria.

In a particular example, this criterion is as follows: the order is given by a list in which the wells (P, I) first in the list are those with higher index (OI and II), those closer to the outer boundary of the domain ($\Omega$) or to the interface boundary between hydrocarbon (O) and water (W) in the domain ($\Omega$), or those having a lesser average distance with precedent or antecedent wells (P, I). With this criterion, there is an adequate choice in the exploitation of the wells (P, I), since the first to be drilled are the ones with more oil potential, the ones more easily reachable from the boundary, and the ones closer to each other. The three conditions can be taken into account at the same time, if weights are given to each one of them.

For the particular example in which both the well location plan and the well drilling location are taken into account, the n parameters (eight in this particular example) are selected by means of a technique such as the Design of Experiment to obtain a certain well location plan and drilling plan. In a further example, well controls are also provided based on estimations of the average potential recovery factor of the reservoir, on usual injection procedures, on standard economic constraints, etc. The number of well location plans and drilling locations, that is, the number of development plans (N) estimated, each one with a set of ($\Omega$) parameters (for example, eight), may then be ranked, to select the most appropriate options, according to techniques such as the net present value (NPV).

The ranking measure is a measure averaged over all reservoir realizations, for instance those reservoir realizations used for the determination of the opportunity index. For example, if NPV is the ranking measure, for each field development plan the ranking measure is the average of all NPVs over all realizations. The computational cost for the evaluation of a development plan mainly depends on the computational cost of the flow simulation. In this case, the Design of Experiments only needs a reduced number of plans because each plan provides well distributions and drilling schedules selected in an efficient manner. Therefore, the Design of Experiments does not need to explore a large amount of well locations in order to reach the efficient ones. Previously, the well distribution was entrusted to the Design of Experiments which required the number of proposals need to be large enough to obtain a reasonable result. Because each proposal requires a flow simulation the computational cost is drastically reduced. For this example, the field development plan with the highest average NPV ranks highest or first.

Figure 10:
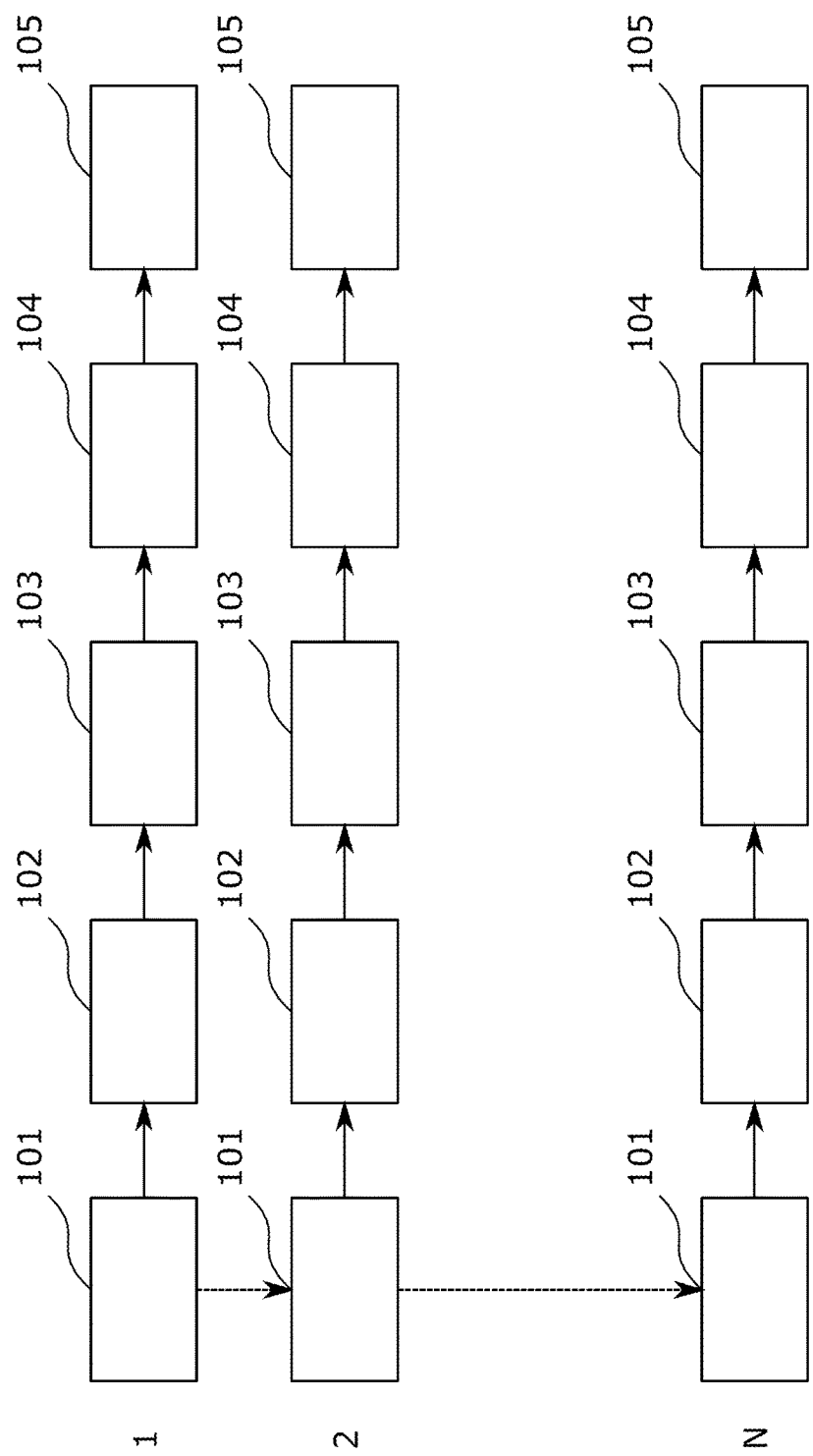
FIG. 10 shows an example of a flow chart diagram of a development plan with n parameters as initial condition and N development plans to be ranked.

FIG. 10 shows a flow chart diagram in which N different ranking measures (105), —for example, NPV—are calculated—one for each development plan starting with a set of n parameters (block 101) m of which generate well locations (102) and the rest, n-m, generating well scheduling plans (103), the development plan provided with well controls (104). Once the ranking measure is evaluated (105), the N different development plans are sorted. The development plan having the highest ranking measure is proposed as the result of the method.

In a further example, the distance between the injector locations within a cluster can be determined through a fixed relation that involves the distance between the injector locations in nearby cluster(s) and the injectivity index. In particular, this does not introduce additional parameters for locating of the injectors.

Advantageously, the present invention dramatically provides accurate heuristic solutions from fewer design parameters than are required for other prior approaches, and therefore, provides a less complex (and less time-consuming) forecast.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of computer generating production a strategy suitable for the exploitation of a reservoir of hydrocarbon in a natural environment and exploiting said reservoir, wherein said natural environment is limited in its surface by a domain ($\Omega$), said method comprising:
   determining a reference system in the domain ($\Omega$);
   determining an opportunity index OI as a function defined in the domain ($\Omega$) providing the local production potential as a function of the location and the local properties;
   determining a radius of drainage rd providing the radius of drainage of the hydrocarbon at the end of life of a production well as a function of the opportunity index rd=rd(OI);
   identifying production behavior zone cluster or clusters (C1, C2) as locations with similar local production behavior;
   for each cluster (C1, C2) to be exploited:
      determining a representative value of the opportunity index OI (OI1, OI2) and its corresponding radius of drainage rd=rd(OI), (rd1, rd2),
      providing an angle $\alpha$ ($\alpha$1, $\alpha$2),
      generating a discretization of the cluster according to a grid with a regular pattern wherein the distance between the closest nodes of the pattern is 2*rd, and the orientation of the grid, selecting a reference line in the grid, in the reference system is the angle $\alpha$, and
      determining the production well locations (P1, P2) in the cluster (C1, C2) as the coordinates of the nodes of the grid located within the cluster (C1, C2); and
   drilling wells at determined said production well locations (P1, P2).

2. A method according to claim 1 wherein the production behavior zone clusters (C1, C2) are defined responsive to the opportunity index OI.

3. A method according to claim 1 wherein after generating production well locations (P) in the domain ($\Omega$), the method comprises generating injection well (I) locations according to:
   for a predetermined cluster (C1, C2) having production wells (P1, P2), defining a pattern in the patterned grid of said cluster (C1, C2), as a group of neighbor production wells (P) wherein the location of said production wells (P1, P2) defines a pattern in the patterned grid; and
   determining the injection well (I1, I2) location in the predetermined cluster as the coordinates of the centroid of the nodes of the pattern that falls within the cluster (C1, C2).

4. A method according to claim 3 wherein the pattern in the patterned grid of at least one cluster has a square shape whose vertices correspond to four neighbor production well locations.

5. A method according to claim 3 wherein the pattern in the patterned grid of at least one cluster has an equilateral triangle shape whose vertices correspond to three neighbor production well locations.

6. A method according to claim 3 wherein the determination of the injection well (I1, I2) location in the predetermined cluster is carried out for all patterns having at least two production wells within said cluster.

7. A method according to claim 1 wherein after generating production well (P) locations in the domain ($\Omega$), the method comprises generating injection well (I) locations by:
   determining the reservoir limit between the hydrocarbon (O) and the water (W) phase in the domain ($\Omega$);
   determining a strip-shaped region (S) extending along the boundary and located in the water side (W);
   identifying behavior zone clusters (S1, S2, S3) in the strip-shaped region (S) as locations with similar behavior responsive to an injectivity index (II) providing the local sweeping potential as a function of the location and the local properties;
   determining a radius of injection (ri) for water providing the radius of injection of an injection well as a function of the injectivity index ri=ri(II);
   determining a first injection well (I1) location in the strip-shaped region; and
   from the first injection well (I1) location, generating further injection well (I1, I2, I3) locations in the strip-shaped region (S), begin each further injection well (I1, I2, I3) location at a distance 2*ri(II) wherein the injectivity index (II) is measured in the cluster (S1, S2, S3) of the strip-shaped region (S) where the former injection well (I1, I2, I3) is located.

8. A method according to claim 7 wherein second and further injection well (I1, I2, I3) locations are generated until the zone clusters (S1, S2, S3) in the strip-shaped region (S) are exhausted or, until the cluster (S1) having the first injection well location (I1) is reached; the condition that is first met.

9. A method according to claim 7 wherein the first injection well location in the strip-shaped region is determined as one of the following options:
   the orthogonal projection of the center of mass of the production well locations onto the interface boundary calculated over the whole production wells (P) of the oil region of the cluster,
   the orthogonal projection of the center of mass of the production well locations onto the interface boundary calculated over the external production wells (P) of the oil region of the cluster, or,
   the orthogonal projection of the location of the production well (P) having higher opportunity index OI onto the interface boundary.

10. A method according to claim 8 wherein the domain ($\Omega$) is discretized in cells and wherein the width of the strip-shaped region (S) one of the following options:
   the width is of one cell,
   the width is a fraction of the distance between a neighbor producer (P) well and the center of its corresponding pattern.

11. A method according to claim 1 wherein the radius of drainage of hydrocarbon at the end of life of a production well as a function of the opportunity index OI is expressed as $rd=a*OI^b$ wherein a,b are positive constants dependent on the local properties.

12. A method according to claim 1 wherein the radius of injection ri for water as a function of the injectivity index II is expressed as $ri=c*II^d$ wherein c,d are positive constants dependent on the local properties.

13. A method according to claim 1 wherein the method, after production well (P) locations and, if any, injection well (I) locations has been determined, further comprises generating a well drilling schedule.

14. A method according to claim 13 wherein generating a well drilling schedule comprises generating a list comprising the production wells (P) and injection wells (I), and sorting said list according to one of:
   listing wells (P, I) according to index;
   listing said wells (P, I) according to closeness to the boundary of the domain ($\Omega$);
   listing said wells (P, I) according to interface boundary between the hydrocarbon (O) and the water (W) in the domain ($\Omega$); and
   listing said wells (P, I) according to average distance with a predetermined number of precedent and antecedent said wells (P, I).

15. A method according to claim 13 wherein the method, after generating a well drilling schedule, further comprises generating production well controls for controlling well production.

16. A production strategy generation and reservoir exploitation system comprising:
   means for determining a reference system in a domain ($\Omega$), wherein said domain ($\Omega$) limits the natural environment surface of a reservoir of hydrocarbon;
   means for determining an opportunity index (OI) as a function defined in the domain ($\Omega$) providing the local production potential as a function of the location and the local properties;
   means for determining a radius of drainage (rd) of the hydrocarbon at end of production well life responsive to said opportunity index; and
   means for identifying one or more production behavior zone clusters (C1, C2) as locations with identified similar local production behavior;
   means for determining a representative value of the opportunity index OI (OI1, OI2) to be exploited and a corresponding radius of drainage (rd1, rd2) for each cluster (C1, C2);
   means for providing an angle $\alpha$ ($\alpha$1, $\alpha$2) for said each cluster (C1, C2);
   means for generating a discretization of said each cluster according to a grid with a regular pattern wherein the distance between the closest nodes of the pattern is 2*rd, and the orientation of the grid, selecting a reference line in the grid, in the reference system is the angle $\alpha$;
   means for determining production well locations (P1, P2) in said each cluster (C1, C2) as the coordinates of grid nodes located within said each cluster (C1, C2); and
   means for drilling wells at determined said production well locations (P1, P2).

17. A production strategy generation and reservoir exploitation system according to claim 16 further comprising means for generating injection well (I) locations comprising:
   means for defining as a group of neighbor production wells (P) a pattern in the patterned grid for any predetermined cluster (C1, C2) having production wells (P1, P2), wherein the location of said production wells (P1, P2) defines a pattern in the patterned grid; and
   means for determining the injection well (I1, I2) location in the predetermined cluster as the coordinates of the centroid of the nodes of the pattern that falls within the cluster (C1, C2).

18. A production strategy generation and reservoir exploitation system according to claim 16 further comprising means for generating injection well (I) locations comprising:
   means for determining the reservoir limit between the hydrocarbon (O) and the water (W) phase in the domain ($\Omega$);
   means for determining a strip-shaped region (S) extending along the boundary and located in the water side (W);
   means for identifying behavior zone clusters (S1, S2, S3) in the strip-shaped region (S) as locations with similar behavior responsive to an injectivity index (II) providing the local sweeping potential as a function of the location and the local properties;
   means for determining a radius of injection (ri) for water providing the radius of injection of an injection well as a function of the injectivity index ri=ri(II);
   means for determining a first injection well (I1) location in the strip-shaped region; and
   means for generating further injection well (I1, I2, I3) locations in the strip-shaped region (S) from the first injection well (I1) location, each further injection well (I1, I2, I3) location beginning at a distance 2*ri(II), the injectivity index (II) being measured in the cluster (S1, S2, S3) of the strip-shaped region (S) where the former injection well (I1, I2, I3) is located.

19. A production strategy generation and reservoir exploitation system according to claim 18 wherein said means for generating further injection well (I1, I2, I3) locations comprises:
  means for generating second and further injection well (I1, I2, I3) locations until the zone clusters (S1, S2, S3) in the strip-shaped region (S) are exhausted, and
  means for generating injection well locations until the cluster (S1) having the first injection well location (I1) is reached; and wherein
said means for determining the first injection well location in the strip-shaped region comprising:
  means for orthogonal projection of the center of mass of the production well locations onto the interface boundary calculated over the whole production wells (P) of the oil region of the cluster,
  means for orthogonal projection of the center of mass of the production well locations onto the interface boundary calculated over the external production wells (P) of the oil region of the cluster, and,
  means for orthogonal projection of the location of the production well (P) having higher opportunity index OI onto the interface boundary.

20. A production strategy generation and reservoir exploitation system according to claim 16 further comprising:
  means for generating production well controls for controlling well production; and
  means for generating a well drilling schedule comprising:
    means for generating a list of the production wells (P) and selectively listing injection wells (I), and
    means sorting said list according to index, closeness to the boundary of the domain ($\Omega$), closeness to the interface boundary between the hydrocarbon (O) and the water (W) in the domain ($\Omega$), and average distance to a preselected number of precedent and antecedent wells (P, I).

* * * * *